Patented June 23, 1925.

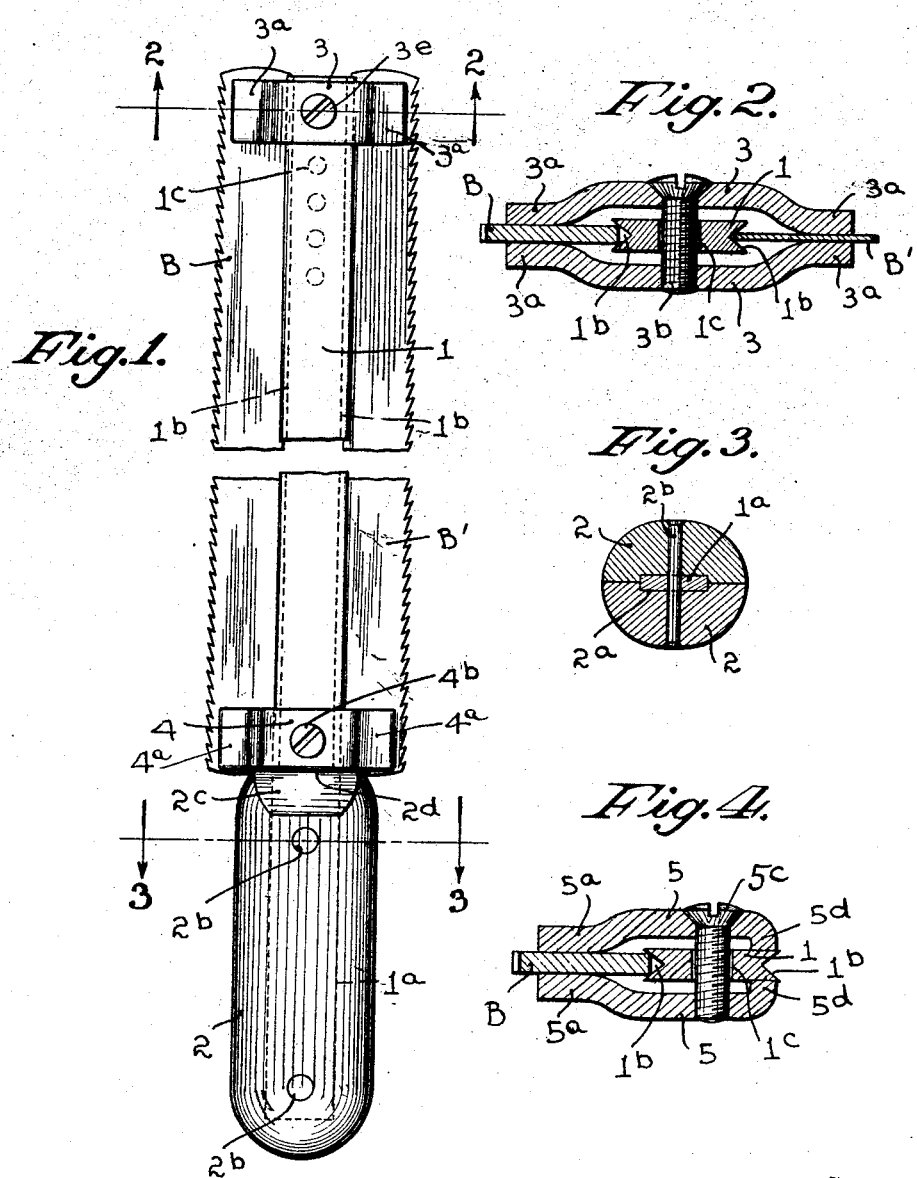

1,543,512

UNITED STATES PATENT OFFICE.

HENRY O. NOYES, OF OAKLAND, CALIFORNIA.

HACK SAW.

Application filed October 28, 1924. Serial No. 746,393.

*To all whom it may concern:*

Be it known that I, HENRY O. NOYES, citizen of the United States, residing at Oakland, in the county of Alameda and State of California, have invented certain new and useful Improvements in Hack Saws; and I hereby declare that the following is a full, clear, and exact description thereof, reference being had to the accompanying drawings which form part of this specification.

This invention is a novel improvement in hack saws, and the principal object thereof is to provide a novel, simple, and compact hack saw holder having a knife-like slenderness, and adapted to hold a single saw blade of any desired thickness, or two hack-saw blades of the same or different desired thicknesses firmly and rigidly.

Another object of the invention is to provide a novel hack saw holder having longitudinally disposed grooves in the side edges thereof adapted to receive the rear edges of the saw blade, so that the rear corners of blades of any desired thickness will contact with the inclined grooves thereby holding the bodies of the blades rigidly and in binding contact with the holder, means being provided for also securing the ends of the blades to the holder, whereby the rigidity imposed at the back and ends of the blades imparts stiffness to and throughout the balance of the blade, and as a result blade tensioning devices such as are ordinarily used on hack saw frames, are not required. Other minor objects of the invention will be hereinafter set forth.

My novel hack saw as especially adapted to facilitate a locksmith in making keys and the like, which keys are usually made by the fit and try process, by hand rather than by the use of a machine; however the saw may be used for any other purpose.

I will explain the invention with reference to the accompanying drawings, to enable others to adopt and use the same, and summarize in the claims the novel features of construction, and novel combinations of parts for which protection is desired.

In said drawings:

Figure 1 is a plan view of a hack saw showing one embodiment of the invention.

Figure 2 is an enlarged transverse section on the line 2—2, Figure 1.

Figure 3 is a section on the line 3—3, Figure 1.

Figure 4 is a transverse sectional view showing a modified form of the clamps used for clamping a single blade to the holder.

In the form shown in Figures 1 to 3 of the drawings, the hack saw comprises a holder 1, to which the hack saw blades B, B' are attached, said holder being provided at one end with opposed clamps 3, and near the handle 2 with a second set of opposed clamps 4 for clamping saw blades B, B' to the holder.

The holder 1 preferably comprises a metallic bar of suitable length and width and preferably slightly greater in thickness than that of the thickest saw blade which is to be clamped thereto, as shown in Figures 2 and 4.

In each side edge of the holder 1 is a V-shaped groove $1^b$ adapted to receive the inner edge of a saw blade B or B' as shown in Figures 1, 2 and 4, the groove being adapted to hold the back edge of the blade rigidly in line with the holder 1, and to prevent deflection of the body of the blade. The groove $1^b$ may be of any suitable form in cross section and broken or continuous so as to hold the blade securely in alinement with the support. Preferably I make the grooves V-shaped, and as will be readily seen from the drawings, the V-shaped grooves permits blades of varying thicknesses to be engaged therewith and held rigidly therein, as the rear or inner corners of the blade contacts with the oppositely inclined faces of the groove $1^b$. The groove $1^b$ may preferably extend from the outer end of the holder 1 down to the inner ends of the handle grips 2, but may extend the entire length of the holder 1 and extension $1^a$.

One end of the holder 1 is preferably extended as at $1^a$ beyond the clamps 4 and to it are attached hand grips 2, of wood or other desired material, which grips are preferably made in two pieces approximately semi-cylindrical in shape, and are provided with longitudinal grooves $2^a$ on their flat faces for the reception of the extension $1^a$, as shown in Figure 3. The grips 2 are shown as secured to the extension $1^a$ preferably by means of countersunk rivets $2^b$ passing through the grips 2 and through perforations in the extension $1^a$. The handle however may be of any desired form and may be secured to the holder 1 in any desired manner. Preferably the inner ends of grips 2 are planed or pared down, as at 2°, to the level of the adjacent clamps 4, hereinafter described, and the inner edges 2ᵈ of the grips are preferably cut at right angles to the axis of the holder 1, and abut squarely against the clamps 4, forming shoulders against which said clamps 4 abut.

Means are provided for securing the blades B, B' in the grooves 1ᵇ, said means preferably comprising two sets of opposed clamps 3 and 4. The opposed clamps 3 and 4 are identical and comprise metallic members disposed transversely of the holder 1, said members being slightly less in length than the combined widths of the holder 1 and blades B, B'.

The outer ends of the clamp members are preferably joggled as at 3ª, 4ª in order to permit the outer ends of the clamp members when placed at opposite sides of the holder 1, to engage the blades B, B' and frictionally bind the blades in the grooves 1ᵇ. The opposite clamp members may be forcibly drawn together and held in position on the holder 1 preferably by means of screws 3ᵇ, 4ᵇ, passing through the opposed clamps and through perforations 1ᶜ, in the holder 1, (see Figure 2) one of the clamp members in each pair being tapped to engage the threaded portion of the related screw 3ᶜ, 4ᶜ. When the screws 3ᶜ, 4ᶜ are loosened the blades B, B' can be removed or replaced, the clamps 3 and 4 will be loosely mounted in the holder 1.

The inwardly bent portions 3ª of the clamp members 3 (and 4) are adapted to contact with the ends of the saw blades B, B'. When the latter are properly positioned against the holder, the backs of the blades should be held in binding engagement with the opposed faces of the grooves 1ᵇ, by hand, while the clamp screws 3ᵇ, 4ᵇ, are being tightened by a screw driver.

The rigidity thus imposed by the handle and clamp on the back and ends of the saws B, B' lends itself throughout the balance of the blades and no blade tensioning means (such as are ordinarily used on ordinary hack saw frames) are needed.

By reason of the adjustability of the opposed members of the clamps 3 and 4, the saws B, B' may be of the same or of different thicknesses, and still may be readily clamped to the holder at opposite sides thereof, thus broadening the field of usefulness of the saw holder, particularly by craftsmen such as locksmiths and others who cut various sized slots in their work, one holder as shown in Figure 1 being capable of holding two different saws.

In my saw the usual open space between the holder and the blade of an ordinary hack saw is eliminated by the direct contact of the blades B, B' with the holder 1; and the overall width of the whole device, even with the added saw, is only about one half the width of the ordinary hack saw. Also the length of my saw is less than the ordinary hack saw as the tensioning screws and their housings, common to the usual hack saws, are eliminated.

It will be readily seen that the holder may be used for various lengths of saws, simply by punching additional holes 1ᶜ, as shown in dotted lines in Figure 1, along the center of the holder 1 at distances which correspond with the different lengths of saws in general use, and adjusting the clamp 3 by engaging the clamp screw 3ᶜ in the proper hole corresponding to the length of the saw.

The squared inner end of the handle 2 forms a shoulder against which the clamp 4 abuts and is held; also the impact of the blades against the object they may be cutting is taken up against the shoulder 2ᵈ. In placing the saws in the frame the inner ends of the saw blades should be placed against this abutment 2ᵈ.

Because of the secure control of the saw and by reason of the compact shape and lightness of a hack saw frame made in accordance with my invention the operator is enabled to do better work, and more rapid work than he can do with the old hack saws and the capability of mounting two saws of different thicknesses on the one holder is a decided practical advantage.

If desired only one blade can be attached to the holder 1 by means of the same clamps 3 and 4. Preferably if only one blade is to be used the clamps 5 as shown in Figure 4 may be used, said clamps 5 being shorter in length than clamps 3 and 4, and having their opposed ends 5ª inwardly bent similarly to clamps 3 and 4 to engage the saw, and other ends inturned, as at 5ᵈ, to contact with the holder 1 adjacent the edge thereof opposite the blade B, so that as the clamp 5ᶜ is tightened, the clamps 5 will securely bind the blade B in the adjacent groove 1ᵇ of the holder.

My novel hack saw holder embodies the features of slenderness, compactness, and central continuous control of the blades, which control is attained by reason of the blades coming in direct contact with the opposed faces of the grooves and being rigidly held therein by the opposed clamps as shown.

The saw blades are held rigidly in the holder by the engagement of the back edge of the saw blade throughout its length with the opposed faces of the groove in the holder—and the groove in conjunction with the end clamps holds the blade against side deflection, buckling or twisting.

In the description I have referred to the holder as grooved on its side edges; that is the preferred construction, and the V-groove is the preferred form of groove, but I do not consider the invention limited to any specific form of groove, because one essential function of the holder is to support the saw against buckling while in action by firmly and rigidly supporting the back of the saw, substantially throughout its length, so that strong pressure can be applied to the saw either downward or with sidewise force during the cutting operation. Furthermore, with this invention the saw can be very quickly and easily removed from its place and interchanged as desired.

I claim:

1. A hack saw, comprising a blade holder of slightly greater width than that of the thickest blade to be used therewith; clamp members disposed transversely of said holder; and means for causing said opposed members to bind the rear edge of the blade against an edge of said holder.

2. A hack saw, comprising a blade holder of slightly greater width than that of the thickest blade to be used therewith; blade clamps adjacent the ends of said holder, each clamp comprising a pair of opposed members extending transversely of said holder and a screw engaging said opposed members for drawing same together to bind a blade against the edge of said holder.

3. A hack saw, comprising a blade holder of slightly greater thickness than that of the thickest blade to be used therewith and having a V-groove in one edge; blade clamp members adjacent the ends of said holder, and means causing said clamp members to bind a blade against the holder with the rear edge of the saw in such groove.

4. A hack saw, comprising a blade holder of slightly greater width than that of the thickest blade to be used therewith; blade clamps at the ends of said holder, each comprising opposed members extending transversely of said holder; and means for drawing said opposed members together to bind the rear edge of the blade against the edge of said holder.

5. A hack saw, comprising a blade holder of slightly greater thickness than that of the thickest blade to be used therewith, and having longitudinal V-shaped grooves in its opposite side edges; blade clamps at the ends of said holder, each comprising opposed members extending transversely of said holder, and beyond the side edges thereof; and means for drawing the opposed members of each clamp together to bind the blades in the grooves parallel with said holder.

6. A hack saw, comprising a blade holder of slightly greater thickness than that of the thickest blade to be used therewith, and having longitudinal V-shaped grooves in its opposite side edges adapted to receive the back edges of the blades inserted therein; a handle at one end of said holder; a blade clamp at the opposite end of said holder; a second blade clamp at the inner end of said handle; said blade clamps each comprising opposed members slightly less in length than the combined widths of the holder and blades, and having their outer ends offset to form jaws; and a screw engaging said opposed clamp members for drawing same together to bind the blades in said grooves parallel with said holder.

In testimony that I claim the foregoing as my own, I affix my signature.

HENRY O. NOYES.